Aug. 17, 1965   I. F. SIMMONS, JR., ETAL   3,201,271
ORGANIC FINISHING SYSTEM FOR APPLICATION TO POLYOLEFINS
AND POLYALLOMERS FOR VACUUM METALLIZING AND
DECORATIVE PURPOSES
Filed April 30, 1962
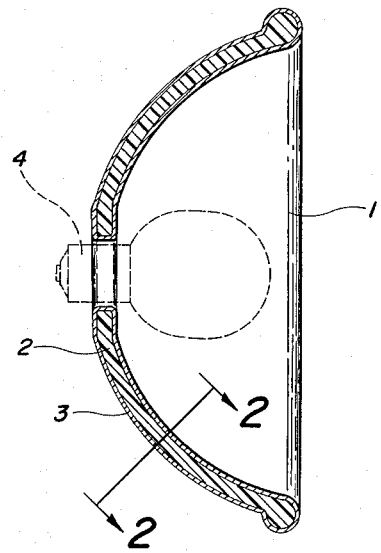
FIG. I
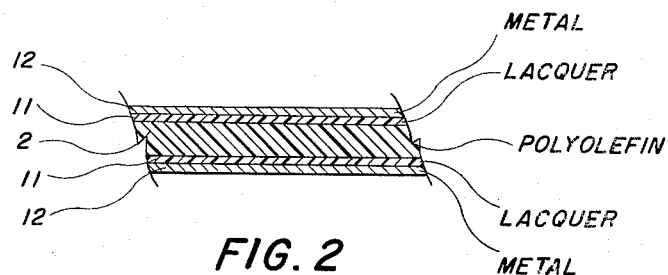
FIG. 2
IRVING F. SIMMONS JR.
RAYMOND G. PINDER
INVENTORS
BY R. Frank Smith
Thomas W. O'Rourke
ATTORNEYS

United States Patent Office 3,201,271
Patented Aug. 17, 1965

3,201,271
ORGANIC FINISHING SYSTEM FOR APPLICATION TO POLYOLEFINS AND POLYALLOMERS FOR VACUUM METALLIZING AND DECORATIVE PURPOSES
Irving F. Simmons, Jr., and Raymond G. Pinder, Rochester, N.Y., assignors to Eastman Kodak Company, Rochester, N.Y., a corporation of New Jersey
Filed Apr. 30, 1962, Ser. No. 191,295
4 Claims. (Cl. 117—47)

This invention concerns a vacuum metallizing system for polyolefins and polyallomers.

Polyolefins and polyallomers have a waxy-like surface which is hydrophobic in nature and presents many problems of adhesion. It is difficult to print on surfaces of polyolefins and polyallomers or to adhere coating compositions. For this reason many methods have been devised for rendering the surface more hydrophilic such as flame treating, oxidation, electron bombardment, and the like. These treatments are successful in rendering the surface hydrophilic but they do not prepare a surface which is suitable to provide a mirror-like metal deposit during subsequent vacuum metallizing, that is causing a metallic layer to be deposited on the surface of the olefin or polyallomer by vaporizing a metal in a vacuum which is then deposited in a thin layer on the surface of the polymeric material. For many purposes it is highly desirable to deposit a metallic surface on plastic surfaces. For instance, it has been desirable to prepare a flashlamp reflector which has a vapor deposited metallic surface of very high quality of mirror-like reflective characteristics. Such a plastic article having a reflecting surface is described in U.S. Patent 2,699,402 which issued Jan. 11, 1955. However, several layers were required to provide a suitable finished product having the characteristics desirable in a flashlamp reflector. Substitution of a polyolefin or polyallomer in the process described in the above patent has resulted in many problems such as poor adhesion to the coating composition, poor surface characteristics and the like. Therefore, it has been desirable to find a coating system which would be applicable to polyolefins and polyallomers which would provide a high quality glossy mirror-like surface on these plastic materials.

We have discovered a method of coating polyolefins and polyallomers which provide a surface on the polyolefins and polyallomers which is receptive to lacquer coatings and which can be used in a vacuum metallizing system for decorative and reflective purposes.

One object of this invention is to provide a method for treating polyolefins such as polypropylene, polyethylene and polyallomers to render the surface adhesive to various coatings such as lacquers and the like. Another object of this invention is to provide a higher gloss vacuum metalized coating to a polyallomer or polyolefin surface. A further object is to provide a method of treating polyolefin surfaces which provides a surface for vacuum metallizing. An additional object is to provide an organic finishing system for application to polyolefins and polyallomers for vacuum metallizing and decorative purposes.

The above objects are obtained by a sequence of steps for treating the polyolefin surface. In our preferred embodiment the polyolefin surface is molded in the shape of a flashlamp reflector from a polyolefin which may be prepared from an α-olefin having 2–10 carbon atoms. Other polyolefins which may be used include mixtures or blends of the above polyolefins as well as polyallomers which are prepared by polymerizing polypropylene and incorporating another polyolefin such as polyethylene, or the like on the end of the polypropylene chai nduring the polymerization. These polyolefins are substantially crystalline having at least about 65% crystallinity. The properties of the polyallomers are listed in Chemical Week, Mar. 31, 1962, pp. 62 and 64.

The polyolefin surface is prepared by exposing the polyolefin to a glow discharge in which the plastic object is placed in a vacuum coater using a high voltage low amperage current. The duration of the discharge, voltage and pressure depend upon the equipment used. In general, the lower the pressure, the lower the voltage required to obtain the same result. Pressures may range from 30–150 microns of mercury, voltages from 3700 to 6250 and the current at about 150 ma. in our preferred embodiment.

The time for treatment is preferably 20–40 minutes.

It will be appreciated that the glow discharge treatment conditions will vary also depending upon the polymeric surface being treated, so that the conditions above are not intended to be controlling. The length of treatment and condition of treatment should be regulated to a point where adhesion can be obtained by a subsequent lacquer coat.

Other methods of preparing the surface may be used which are known in the art such as electron bombardment, flame treatment, solvent treatment, oxidation, chlorination, and the like which can also be used to prepare the surface of the polyolefin for adherence to subsequent coatings.

A base coat is applied over the surface of the polyolefin which has been given the treatment to render it sufficiently receptive to obtain adhesion. The base coat consists of an unique mixture of epoxy, thermosetting acrylic, and polyamide resins containing an acid catalyst with suitable organic volatile solvents.

Our preferred formulation, for example, for this base coat consists of the following:

| Composition: | Percentage in the amount of the lacquer |
|---|---|
| Epoxy resin—50% solution in ethylene glycol mono ethyl ether | 13 |
| Thermosetting acrylic resin (50% solid) | 9 |
| Ethylene glycol mono ethyl ether | 51.85 |
| Polyamide resin | 2 |
| Low flash naphtha | 2 |
| Isopropyl alcohol | 12 |
| Toluol | 6 |
| Methylisobutylketone | 2 |
| Xylol | 2 |
| Acidic catalyst | 0.15 |
| | 100 |

A general formula for our lacquer is as follows:

| Non-volatile portion: | Percentage in the amount of the lacquer |
|---|---|
| Epoxy resin (such as Dow Co. DER 661) | 6.50±3 |
| Acrylic resin (such as Rohm & Haas AT–51) | 4.50±3 |
| Polyamid resin (such as Gen'l Mills Versamid 115) | 2.00±1 |
| Acid catalyst (such as Am. Cyanamid Beetle 296–9) | 0.15±0.05 |
| Total non-volatiles | 13.15 |

| Volatile portion: | Percentage in the amount of the lacquer |
|---|---|
| Ethylene glycol monoethyl ether[1] | 58.35 |
| V M & P (low flash) naphtha | 2.00 |
| Isopropyl alcohol | 12.00 |
| n-Butyl alcohol[1] | 1.00 |
| Methyl isobutyl ketone | 2.00 |
| Toluene | 6.00 |
| Xylene[1] | 5.50 |
| Total volatiles | 86.85 |

[1] Portions found in resin solutions as purchased. Amounts and kinds of organic volatile solvents may be varied. The above is our preferred embodiment for spray application at the indicated solids.

The base coat in this invention can be modified by the addition of pigments or other coloring materials to give a colored finish which would adhere well to the polyolefins and polyallomers after the low discharge treatment or any other pretreatment for these wax-like plastics. The base coat in this invention could be modified by the addition of flatting agents such as silica or the like to give a "satin" or matte aluminized finish. The base coat mentioned herein may also be used as a base coat for the vacuum metallizing other plastics such as polystyrene.

The essential ingredients of our lacquer are an epoxide resin a polyamide resin, and an acrylic resin, in a compatible solvent mixture, together with suitable agents such as pigments and dyes.

The epoxide resin represents a class of condensation polymers which have the following structure:

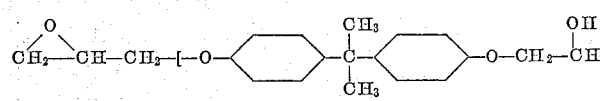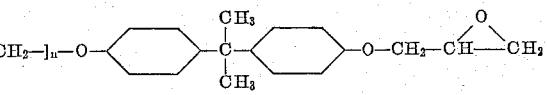

in which $n$ is a whole number from 1 to 5.

The polyamide resin has a general formula:

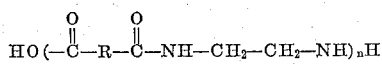

wherein $n$ is a whole number from 5 to 15 and R is an alkylene group having from 5 to 20 carbon atoms. A particularly useful component is the polyamide having the above formula in which R is $C_{17}H_{34}$.

The acrylic resin which is preferably used is a thermosetting 60% copolymer of methyl methacrylate and styrene (10—20% by weight of the copolymer being polystyrene) with 40% melamine formaldehyde. However, the acrylic resin must be compatible, since a cloudy mixture and coating result if an incompatible resin is employed.

The catalyst may be tertiary butyl phosphoric acid in our preferred embodiment but may also be any one of butyl phosphoric, p-toluenesulfonic acid, and the like.

After the lacquer coating has been applied on the treated surface, a vacuum deposited aluminum film may be made directly to the base-coated plastic and then over sprayed with a top coat. This will result in good adhesion to the plastic of the aluminum and top coat.

In our preferred embodiment the metallizing operation is conducted in a vacuum in which the metal is vaporized and caused to deposit on the surface of the plastic. Aluminum is preferably employed as the coating metal and the aluminum available on the market as "Alcoa 2-S" may be advantageously employed.

When the metallizing is completed the vacuum coating apparatus is brought back to atmospheric pressure and the metallized plastic object is removed from the apparatus.

The invention will be further understood by reference to the drawings in which:

FIG. 1 is a section of a reflector made in accordance with the instant invention; and FIG. 2 is a magnified cross-sectional view of the structure of the reflector taken on line 2—2 of FIG. 1 showing more clearly the coatings on the plastic base.

Referring to FIG. 1, there is shown in section a photoflash reflector 1 having a body portion 2 preferably made of a polyolefin such as polyethylene, polypropylene or polyallomer. The reflector body may be formed by any of the well-known molding methods.

The layers shown generally as 3 in FIG. 1 are illustrated in detail in FIG. 2. A lacquer coating 11 having the above-discussed formula is placed upon the activated polyolefin body portion 2 and cured. When the curing of lacquer coating 11 is complete, a metal coating 12 is vacuum deposited thereon. Metal coating 12 is preferably aluminum.

The metallized reflector can be assembled with a fixture having a flash bulb socket and means for attaching to a camera body. Such assembly units form no part of the instant invention. For purpose of illustration, however, a flash bulb 4 is shown positioned in the reflector 1 and FIG. 1.

Various apparatus in which metals can be vaporized and coated onto an article in vacuum may be employed for this step in our process for making metallized plastic objects. A vacuum coating apparatus manufactured commercially is quite suitable for production use. This unit includes a cylindrical vacuum chamber, large enough to coat approximately 200 plastic reflectors of a size used on commercially produced cameras. The plastic units are supported on a plurality of rods running lengthwise in the chamber and during the coating operation are rotated around the horizontal axis of the vacuum chamber. In this way all portions of the surface of each reflector is exposed to the metal vapors which condense and form a uniform coating thereon. In a similar manner radio grilles, knobs and handles can be positioned in the metal coating apparatus. The vacuum may be produced by mechanical pump and a diffusion pump which are operated in the usual manner. A vacuum of ½ micron of mercury gives a satisfactory metal coating.

While photoflash reflectors are advantageously made in accordance with our invention, it is emphasized that automobile hardware such as the handles described above can likewise be prepared with a metal-like coating over the polyolefin base. Such automobile appointments as grilles, door handles, light fixtures and other decorative articles having bodies of polyolefins may be metal coated and overcoated in the manner described herein. By suitably masking portions of the plastic, metal designs may be formed upon the plastic body thereby permitting the plastic to be presented in suitable color contrasts with the reflecting design.

A top coat may be applied over the aluminum or metal surface such as clear varnish. This material is not the only topcoat which can be used but it is our preferred material since it provides a relatively hard surface that protects the metallized surface against abrasion and the like.

The finishing system mentioned in this application can be used for either first or second surface work. A first surface is where the finish is on the front surface, while the second surface is where the finish is viewed through the substrate.

The invention has been described in detail with particular reference to preferred embodiments thereof, but it will be understood that variations and modifications can be effected within the spirit and scope of the invention as described hereinabove and as defined in the appended claims.

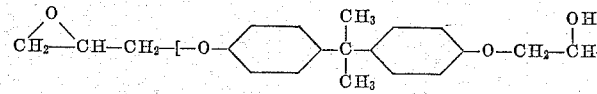

We claim:

1. A metallized article comprising a substrate consisting essentially of a glow discharge treated polyolefin selected from the group consisting of polyethylene, polyallomer and polypropylene, an intermediate coating on said substrate of a lacquer, the non-volatile constituents of which comprise about 3.5–9.50% by weight of an epoxide having the typical structure:

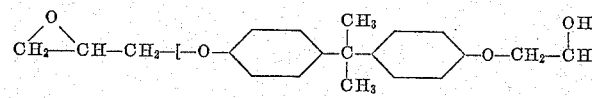

wherein $n$ is a whole number from 1 to 5; 1.5–7.5% of a compatible resin comprising 60% of a copolymer consisting of 80–90% methyl methacrylate and 10–20% styrene with 40% melamine formaldehyde; 1.0–3.0% of a polyamide resin having the typical structure:

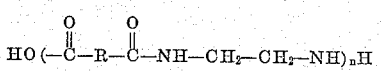

wherein $n$ is a whole number from 5 to 15 and R is an alkyl group having from 5 to 20 carbon atoms and 0.10 to 0.20% of an acid catalyst, and about 79.80 to 93.90% by weight of an organic solvent for the non-volatile constituents; and a vacuum deposited metal coating on said lacquer coated substrate.

2. An article as set forth in claim 1 wherein said vacuum deposited metal coating is aluminum.

3. The method of applying a metal coating to a substrate essentially consisting of a polyolefin selected from the group consisting of polyethylene, polyallomer and polypropylene, which comprises:

(1) placing the substrate in an atmosphere having a pressure of about 30–150 microns of mercury, and subjecting the surface of the substrate to a voltage of from 3,700–6,250 at a current of about 150 ma.;

(2) coating the surface of the substrate with a lacquer, the non-volatile constituents of which comprise about 3.5–9.50% by weight of an epoxide having the typical structure:

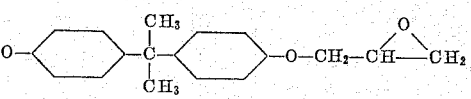

wherein $n$ is a whole number from 1 to 5; 1.5–7.5% of a compatible resin comprising 60% of a copolymer consisting of 80–90% methyl methacrylate and 10–20% styrene with 40% melamine, formaldehyde; 1.0–3.0% of a polyamide resin having the typical structure:

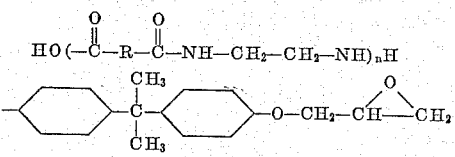

wherein $n$ is a whole number from 5 to 15 and R is an alkyl group having from 5 to 20 carbon atoms and 0.10 to 0.20% of an acid catalyst, and about 79.80 to 93.90% by weight of an organic solvent for the non-volatile constitutents;

(3) curing the lacquer coating; and (4) vacuum depositing a metal coating on the coated substrate.

4. A method as set forth in claim 3 wherein the metal which is vacuum deposited is aluminum.

References Cited by the Examiner

UNITED STATES PATENTS

| | | | |
|---|---|---|---|
| 2,699,402 | 1/55 | Meyer | 117—35 |
| 2,917,439 | 12/59 | Lin | 117—71 XR |
| 2,987,492 | 6/61 | Pinder | 260—42 |
| 2,993,806 | 7/61 | Fisher et al. | 117—71 |
| 3,052,659 | 9/62 | Woodruff | 260—45.5 |

OTHER REFERENCES

Holland, L.: "Vacuum Deposition of Thin Films," N.Y., John Wiley and Sons, 1956, Chapter 12, pp. 336–376.

RICHARD D. NEVIUS, *Primary Examiner.*

JOSEPH REBOLD, *Examiner.*